E. HART.
DISTILLATION APPARATUS.
APPLICATION FILED MAR. 27, 1911.

1,096,838.

Patented May 19, 1914.

WITNESSES

INVENTOR
EDWARD HART
BY
ATTORNEYS

UNITED STATES PATENT OFFICE.

EDWARD HART, OF EASTON, PENNSYLVANIA, ASSIGNOR TO GENERAL CHEMICAL COMPANY, OF NEW YORK, N. Y., A CORPORATION OF NEW YORK.

DISTILLATION APPARATUS.

1,096,838.  Specification of Letters Patent.  Patented May 19, 1914.

Application filed March 27, 1911.  Serial No. 617,007.

*To all whom it may concern:*

Be it known that I, EDWARD HART, a citizen of the United States, and resident of Easton, Northampton county, State of Pennsylvania, have invented certain new and useful Improvements in Distillation Apparatus for Acids and other Substances, of which the following is a specification.

My invention relates to distillation apparatus and particularly to the type of such apparatus described and patented to me in the United States under date of May 3, 1898, No. 603,508. The patent referred to shows a distillation apparatus comprising essentially a plurality of acid tubes B suspended from and opening into main tubes or acid receivers A, a suitable furnace being built about said acid tubes whereby the same may be heated. Suitable means was provided for supplying acid to the receivers from which it flowed into the acid tubes so as to fill them, the distillation product being carried off by exit pipes F and the residue containing impurities flowing away through pipes provided for the purpose.

In the above arrangement of apparatus as shown in the patent referred to, no provision was made for insuring circulation of the acid in or through the acid tubes and as a result, where salts were present in solution, said solution rapidly became more concentrated until finally crystals separated out, choked the tubes, and stopped the operation of the apparatus.

My present invention comprises essentially the application of means to the apparatus as described in the above mentioned patent such that positive circulation through the tubes is always insured so that the apparatus may be maintained in continuous operation.

The nature of my improvements will be better understood by reference to the accompanying drawings, in which—

Figure 1:
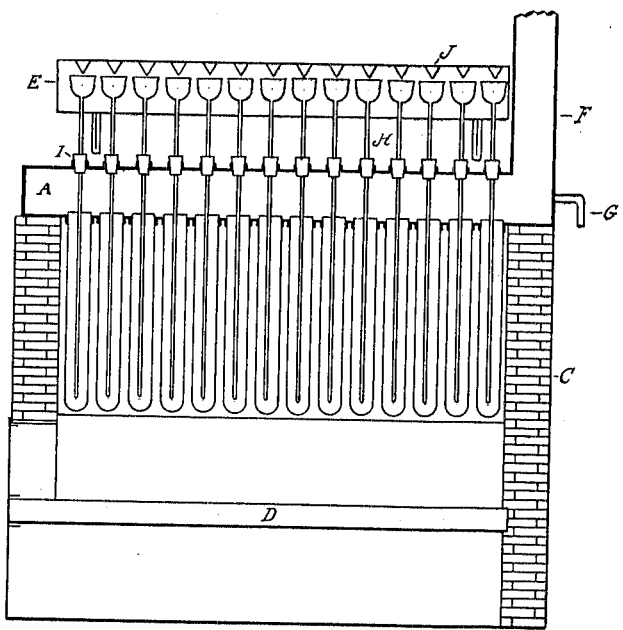
Figure 2:
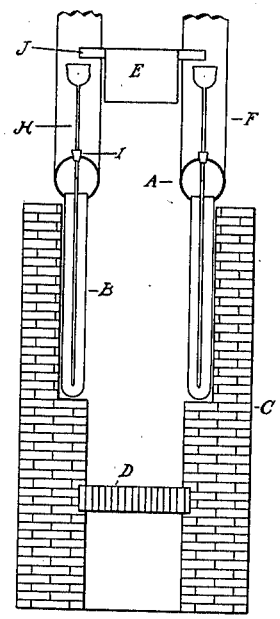

Figure 1 represents a central longitudinal section through a row of acid tubes and Fig. 2 a transverse section through corresponding acid tubes of the completed apparatus.

Referring to the drawings A, A are the main tubes or acid receivers, preferably made of stoneware or equivalent material not acted upon by acids from the bottom of which are suspended suitably spaced acid tubes B preferably of glass, as for example the usual glass test tubes used in chemical manipulation. These test tubes may be fitted and sealed into the acid receivers in any convenient way. Preferably I employ two similar main tubes A arranged side by side with similar rows of dependent acid tubes B. These main tubes with their attached acid tubes have disposed about them and are supported by bricked furnace walls C; a grate D is provided upon which the fuel may be burned.

Corresponding to each acid tube is a thistle tube H held by a stopper I itself fitted into an opening in the top of the main tube directly over the acid tube. The bottom end of the thistle tube reaches nearly to the bottom of the acid tube B and its top end or receiver extends above the main tube far enough to permit of placing a longitudinal crude acid trough E between the two rows of thistle tubes, said acid trough being provided with laterally extended overflow feed troughs J, the ends of which overhang the center of the thistle tube receivers. Any convenient means may be provided for supplying acid continuously to the acid trough E.

The ends of the main tube A are closed and each of said tubes is provided with an exit pipe F through which the distilled vapor passes off to such apparatus as may be used for its condensation. A small pipe or residue siphon G at the end of each main tube is also provided.

In operation the crude acid being continuously supplied to the acid trough E, overflows at substantially equal rates through the feed troughs J and into the several thistle tubes H. The acid flows through these thistle tubes to the bottom of the acid tubes B and up through the said acid tubes on the outside of the thistle tubes to the main tubes A, vapors being distilled off from said tubes during this flow and passing away through the exit tube F. The residue of undistilled acid with its impurities is carried away by the residue siphon G. The circulation just described is maintained continuously by reason of the pressure due to the continuously maintained column of acid in the thistle tubes J.

By regulating the flow of material through the residue siphon G as also by regulating the heating and the supply of crude acid, the material may be concentrated to any desired degree.

The apparatus described has all the advantages of the previously referred to apparatus shown in my patent above mentioned No. 603,508, i. e., a very large heating surface is secured, breakage of any acid tube B is easily repaired by removal of the broken tube and substitution of another, and the small amount of acid contained in each acid tube reduces to a minimum the loss and danger consequent upon the fracture of any individual tube.

While I have described my apparatus as particularly applicable to the treatment of acids, I do not intend to limit it thereto, as it is obvious that it may be used for almost any kind of fluid material where distillation or concentration or both are desired.

While I find that positive circulation is well and simply provided by the use of thistle tubes as shown in the drawings and as above described, I do not wish to confine myself to such use, but to cover other means of introducing the material to be operated upon into the bottom of the acid tubes and of forcing the same upwardly therethrough.

I therefore claim:

1. In a distillation apparatus, an acid trough, a main tube entirely separated from said acid trough, a plurality of acid tubes dependent from said main tube, and tubes having an end arranged to receive material from said acid trough and extending within and nearly to the bottom of the acid tubes.

2. In a distillation apparatus, a main tube, a plurality of acid tubes dependent therefrom, thistle tubes within and reaching nearly to the bottom of said acid tubes and having their outer ends above said main tube, and means for supplying material to said thistle tubes, substantially as and for the purpose described.

3. In a distillation apparatus, a main tube, a plurality of acid tubes dependent therefrom, an acid trough provided with overflow feed troughs above said main tube, and thistle tubes within said acid tubes, said thistle tubes having their receivers arranged to coöperate with said overflow feed troughs, substantially as and for the purpose described.

4. In a distillation apparatus, a main tube adapted to have residue material flow therethrough, a plurality of acid tubes dependent therefrom, thistle tubes within and reaching nearly to the bottom of said tubes and having their outer ends above the level of material in said main tube, means for supplying material to said thistle tubes, and means for removing the vapors distilled, substantially as and for the purpose described.

5. In a distillation apparatus, a main tube provided with a vapor exit and a residue siphon, a plurality of acid tubes dependent therefrom, an acid trough provided with overflow feed troughs above said main tube, and thistle tubes within and reaching nearly to the bottom of said acid tubes, said thistle tubes passing through and above said main tube but removably dependent therefrom and having receiver ends arranged to coöperate with and receive material from said overflow troughs, substantially as and for the purpose described.

In testimony whereof I have hereunto set my hand and seal in the presence of two subscribing witnesses.

EDWARD HART. [L. S.]

Witnesses:
FRANK F. KIRKPATRICK,
FRITZ V. BRIESEN.

---

Copies of this patent may be obtained for five cents each, by addressing the "Commissioner of Patents, Washington, D. C."